United States Patent [19]

Wang

[11] Patent Number: 6,158,217
[45] Date of Patent: Dec. 12, 2000

[54] LOW OPERATING-TEMPERATURE SUPERCHARGED ENGINES

[75] Inventor: Lin-Shu Wang, Stony Brook, N.Y.

[73] Assignee: The Research Foundation of the State University of New York, Stony Brook, N.Y.

[21] Appl. No.: 09/219,940

[22] Filed: Dec. 23, 1998

[51] Int. Cl.[7] .................................................. F02B 29/04
[52] U.S. Cl. ................................................. 60/599; 60/601
[58] Field of Search ..................... 60/599, 601; 123/563, 123/438, 478

[56] References Cited

U.S. PATENT DOCUMENTS 4,873,961  10/1989  Tanaka ........................................ 60/601

FOREIGN PATENT DOCUMENTS 2811684  9/1979  Germany ................................. 60/599
56-50216  5/1981  Japan ..................................... 123/563
6-50159  2/1994  Japan ..................................... 60/599

Primary Examiner—Noah P. Kamen
Attorney, Agent, or Firm—Scully, Scott Murphy & Presser

[57] ABSTRACT

A supercharged internal combustion engine which includes a turbocharger which includes a compressor and a turbine in communication with ambient air wherein that air is pressurized by the compressor to greater than ambient pressure. An intercooler, in communication with the outlet of the compressor, reduces the temperature of the greater than ambient pressure air. An intake manifold, in communication with the outlet of the intercooler, distributes the cooled and above ambient pressure air into an internal combustion engine. The internal combustion engine, which may be a diesel engine, a spark ignition gasoline engine or a direct ignition gasoline engine, is provided with an exhaust manifold in communication with the turbine of the turbocharger. A fuel metering means, introduces fuel into the internal combustion engine, such that the equivalence ratio of the mixture of fuel, provided by the fuel metering means, to air, provided by the intake manifold, is less than the equivalence ratio of an internal combustion engine at the smoke point or at an equivalence ratio operating at an equivalence ratio of about 0.85 to about 0.95. The supercharging parameter of air is greater than the supercharging parameter of air entering the internal combustion engine at the smoke point or at an equivalence ratio of between about 0.85 and about 0.95.

16 Claims, 3 Drawing Sheets

LOW OPERATING-TEMPERATURE SUPERCHARGED ENGINES

BACKGROUND OF THE DISCLOSURE

1. Field of the Invention

The present invention relates to supercharged internal combustion engines. More specifically, the present invention is directed to a turbocharged-intercooled engine provided with an intake-manifold charge of temperature lower than the ambient air at high compression which is mixed with fuel forming a low-equivalence-ratio mixture resulting in a burned charge of low peak-cylinder-temperature.

2. Background of the Prior Art

H.R. Ricardo stated, "The piston engine is eminently suitable to deal with relatively small volumes at high pressure and temperature and the turbine, by virtue of its high mechanical efficiency and large flow areas, to deal with large volumes at low pressures. Clearly the logical development is to combine the two in series to form a compound unit" (Smith 1955:279–280). He envisaged an engineering system, not as a modification of the piston engine, but as a new rational whole with the compelling logic of resulting mechanical (gas exchanging) advantage and thermodynamic advantage. This thermodynamic advantage will be further enhanced by adding intercooling to the combined system.

The efficient gas-exchanging advantage of turbocharged engines produces the desired power boosting. However, the theoretical thermodynamic advantage of turbocharged engines and turbocharged-intercooled engines is not fully realized for engines that are required to operate over a wide range of speed and load for the following reason: a turbocharger unit and a piston-engine unit are mechanical devices of complete different characteristics. While they can be matched at a given operation point, they are poorly matched away from this specific operation point. For example, when a turbocharger, which is matched with a piston unit for good torque-back-up, is operated at high engine speed and load, its turbine pressure ratio is much higher than the required value. This results in excessive available energy in the exhaust charge driving the turbine. One common solution is bypassing some of the exhaust charge through a "waste gate." This way of forcing the two units to operate together over a wide range of speed and load by a highly dissipative process is an unsatisfactory engineering solution, which counteracts the thermodynamic advantage of turbocharging. In fact, specific fuel consumption of turbocharged gasoline engine is often worse than an equivalent naturally-aspirated engine at high speed and load, conditions under which waste gate is in effect.

Turbo-compound engines may be considered to be an engineering solution to reducing the dissipative loss of waste gate operation by harnessing exhaust gas energy in a power-turbine. Unfortunately, this solution still encounters the mismatching difficulty of two components in a complex system—the two components here being the power turbine unit and the piston unit. Complex transmission between them is required in order to achieve the expected gain in efficiency. This results in a system that is too complex to be commercially successful. The full realization of the considerable potential of turbocharged engines in both mechanical advantage and thermodynamic advantage thus calls for a simple and effective solution to the matching problem.

Another potential advantage of the application of turbocharging, which was not directly pointed out by Ricardo, is the advantage of low operating-temperature. The benefit of lowering operating temperature is considerable, including reduction in $NO_x$ production, engine operating away from smoke limit, durability and ease of maintenance. Lower operation temperature can be achieved by reducing the fuel-air ratio or the equivalence ratio in combination with increasing supercharging pressure ratio, so that brake mean engine pressure (bmep) remains unchanged. The challenge is in lowering operating temperature while maintaining bmep without sacrificing thermal efficiency. My investigation has uncovered a design-parameter combination for a turbocharged engine such that its bmep remains unchanged (under constant peak-cylinder-pressure constraint), its peak cylinder temperature is reduced significantly, over 300C, and its thermal efficiency will increase moderately.

Since the Otto prototype four-stroke engine was first used in 1876, significant improvement in engine performance has been brought about according to the Carnot-Otto-Diesel paradigm: theoretical thermal efficiency of combustion engines increases with increasing operating pressure (mechanical load) and operating temperature (thermal load). Operating pressure and operating temperature do not vary independently. Improvement in engine performance requires the simultaneous advances in mechanical load limit (cylinder pressure and turbo speed) and thermal load limit (exhaust temperature, and smoke limit in the case for diesel engines). This performance improvement has slowed in recent years due to the difficulty of raising thermal load. The present invention suggests a revision of the Carnot-Otto-Diesel paradigm: thermal load is removed as a limiting factor in improving engine performance. With the possibility of keeping operating temperature from rising (with pressure) and compression ratio kept at moderate level due to high a (supercharging parameter), it is once again attractive and viable to consider increasing peak cylinder pressure for performance gain. The onward performance improvement in thermal efficiency and power output of internal combustion engines, since their invention by Otto and Diesel, can be resumed.

SUMMARY OF THE INVENTION

The present invention provides a simple and effective solution to turbocharger/piston-engine matching, which produces further increase in power and fulfillment of the potential of fuel economy gain in a turbocharged engine.

The present invention comprises a supercharged-intercooled engine and a "cryo-cooler" unit, which is placed between the intercooler and the intake-manifold. The cryo-cooler is composed of two flow paths, an expander/suction-compressor, a heat exchanger, and a bypass valve. During low engine speed/load operation the bypass valve opens to one path alone and directs all compressed and intercooled air to the intake manifold. During high speed/load operation, when exhaust charge with excessive enthalpy is available to drive the turbine, the bypass valve opens to both paths: the (above) path which is connected to the intake manifold and a path that directs the compressed and intercooled air through expander, heat exchanger, and suction compressor exiting to the atmosphere. As a result, the compressor of the turbocharger processes larger amount of air, absorbing the output from the excessive-enthalpy-exhaust driven turbine.

With the matching of turbocharger to piston engine achieved without a highly dissipative process, the present invention further seeks to apply turbocharging of higher pressure ratio in combination with a fuel-air mixture of lower equivalence-ratio in a design-parameters combination that produces the same bmep, significantly lower operating temperature, and moderately higher thermal efficiency. The present invention furthermore provides a high peak cylinder pressure turbocharged intercooled engine without requiring higher thermal load for further engine performance gain in both power-torque and fuel economy.

BRIEF DESCRIPTION OF THE DRAWINGS

The present invention will be better understood by reference to the accompanying drawings of which.

DETAILED DESCRIPTION

Figure 2:
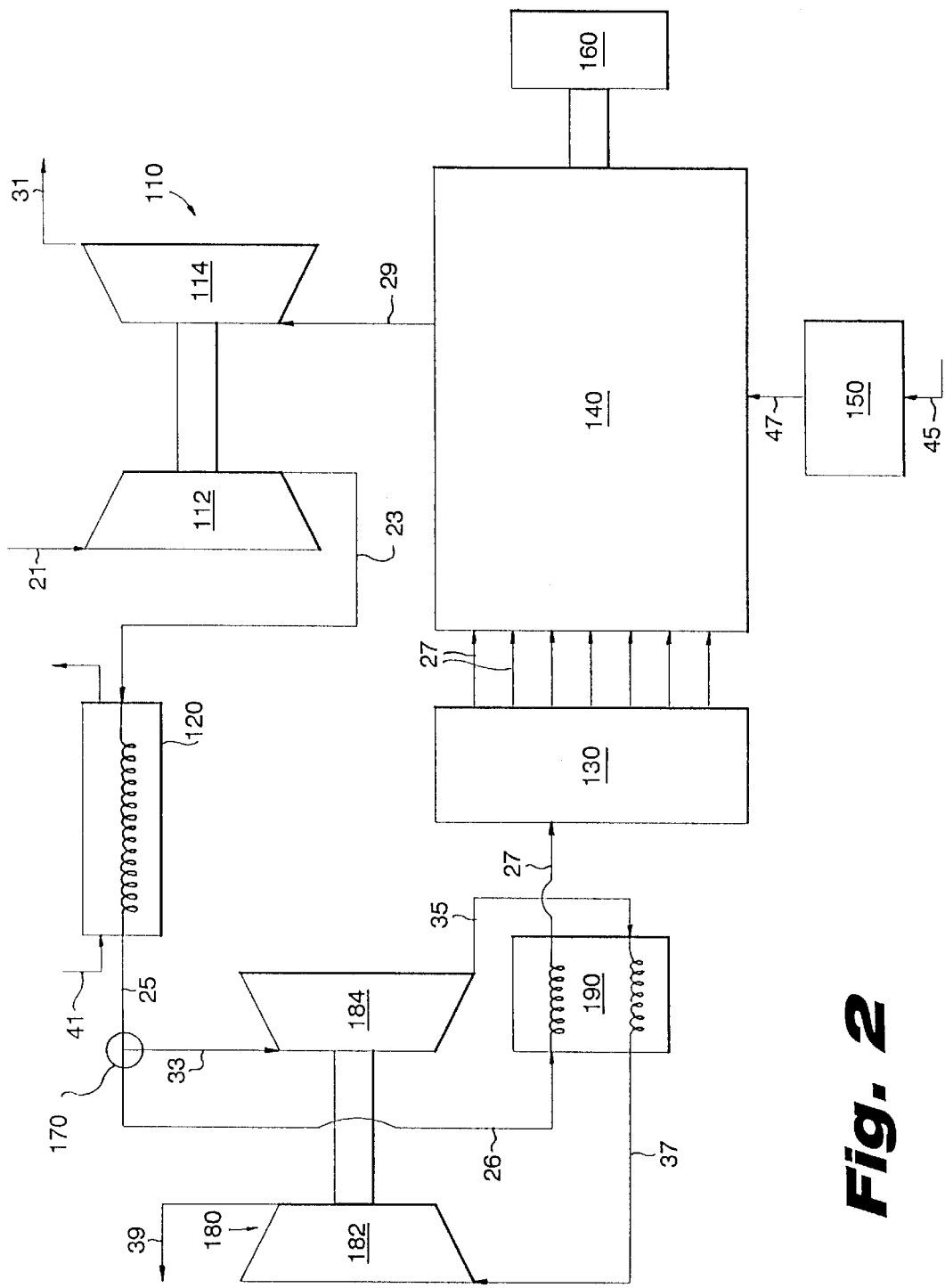
FIG. 2 is a flow diagram of another embodiment of the supercharged internal combustion engine of the present invention.

A supercharged intercooled engine in accordance with the present invention is depicted in FIG. 2. An ambient air stream 21, characterized by temperature $T_0$ and pressure $p_0$, enters the compressor 112 of a first compressing means, preferably a turbocharger 110. More specifically, air stream 21 enters the compressor 112 of the turbocharger 110. Therein, air stream 21 is pressurized such that its temperature and pressure are increased to $T_1$ and $p_1$, exiting compressor 112 as air stream 23. Air stream 23 is in communication with a cooling means, preferably a first intercooler 120. Intercooler 120 is a heat exchanger, wherein air stream is cooled by a coolant 41 to a temperature $T_2$, exiting as air stream 25. The pressure of air stream 25, $p_2$, is only slightly lower than $p_1$ as a result of pressure head loss in intercooler 120.

Air stream 25 communicates with an air separating means 170. Air separating means 170, in a preferred embodiment, is a bypass valve which separates a portion of air stream 25 into a second air stream 33. The remainder of air stream 25, hereafter designated as the first air stream, is denoted by reference numeral 26. The first air stream 26 is conveyed from the bypass valve 170 to a second heat exchanger 190.

Second air stream 33 is in communication with an expansion means. The expansion means, in a preferred embodiment is an expander 184. Still more preferably, the expander 184 is part of an expander/suction-compressor unit 180. Specifically, second air stream 33 is in communication with the inlet of the expander 184 of which is preferably part of the expander/suction-compressor unit 180. Air stream 33 undergoes expansion process in turbine expander 184 from $p_2$ to $p_3$. The exit pressure p3 from expander 184 is determined by the power balance between turbine expander 184 and suction compressor 182 of the expander/suction-compressor unit 180. The energy expended in operating turbine expander 184 reduces the temperature of second air stream 33 from $T_2$ to $T_3$, which is well below the ambient air temperature. This air stream leaving expander 184 at $T_3$, denoted by reference numeral 35, is thereupon conveyed to the second heat exchanger 190, wherein heat transfer takes place from first air stream to the second air stream. Second air stream exits the second heat exchanger 190 at a temperature $T_4$ and a pressure $p_4$, which is only slightly lowered than $p_3$, as air stream 37. First air stream exits the second heat exchanger 190, as air stream 27, at a pressure $p_6$, which is only slightly lowered than $p_2$, and at a temperature $T_6$, which will be below ambient air temperature.

The second air stream 37 is either discharged to the atmosphere, in the case where no suction compressor unit is provided or in a preferred embodiment in communication with the inlet of a suction-compressor 182 of the expander/suction-compressor unit 180. Compressor 182, powered by expander 184, increases the pressure $p_4$ of air stream 37, which is less than atmospheric, to atmospheric. Thus, the air stream leaving the compressor 182, now designated by reference numeral 39, is characterized by a pressure $p_5$ which is equal to $p_0$, and a temperature $T_5$, which is increased by compressor 182 to a value moderately above ambient air temperature. Discharging air stream 39 into atmosphere represents only a moderate loss of available energy—unlike the large loss of available energy from the discharge through the waste-gate of standard turbocharged engines.

Air stream 27 is in communication with an intake manifold means 130 which distributes the first air stream. Manifold means 130 is, in turn, in communication with the cylinders of an internal combustion engine 140. The internal combustion engine is provided with a crankshaft and an exhaust manifold.

In a preferred embodiment, where supercharging is provided by a turbocharger, turbocharger 110 is satisfactorily matched to the engine 140, the bypass valve 170 opens to air stream 26 path alone and directs all compressed and intercooled air 25 to the intake manifold 130. During high speed/load operation, when exhaust charge with excessive enthalpy is available to drive the turbine, the bypass valve 170 opens to both air stream 26 and air stream 33 paths. As a result, the compressor 112 of the turbocharger 110 processes larger amount of air 21, 23, 25, absorbing the power output from the excessive-enthalpy-exhaust driven turbine 114.

The product of combustion, exhaust gas stream 29, is discharged to the atmosphere or in a preferred embodiment, exits internal combustion engine 140 and is fed into the inlet of turbine 114 of turbocharger 110. That turbine powers the first compressor 112, which draws ambient air stream 21 into engine 140, completing the cycle.

Figure 3:
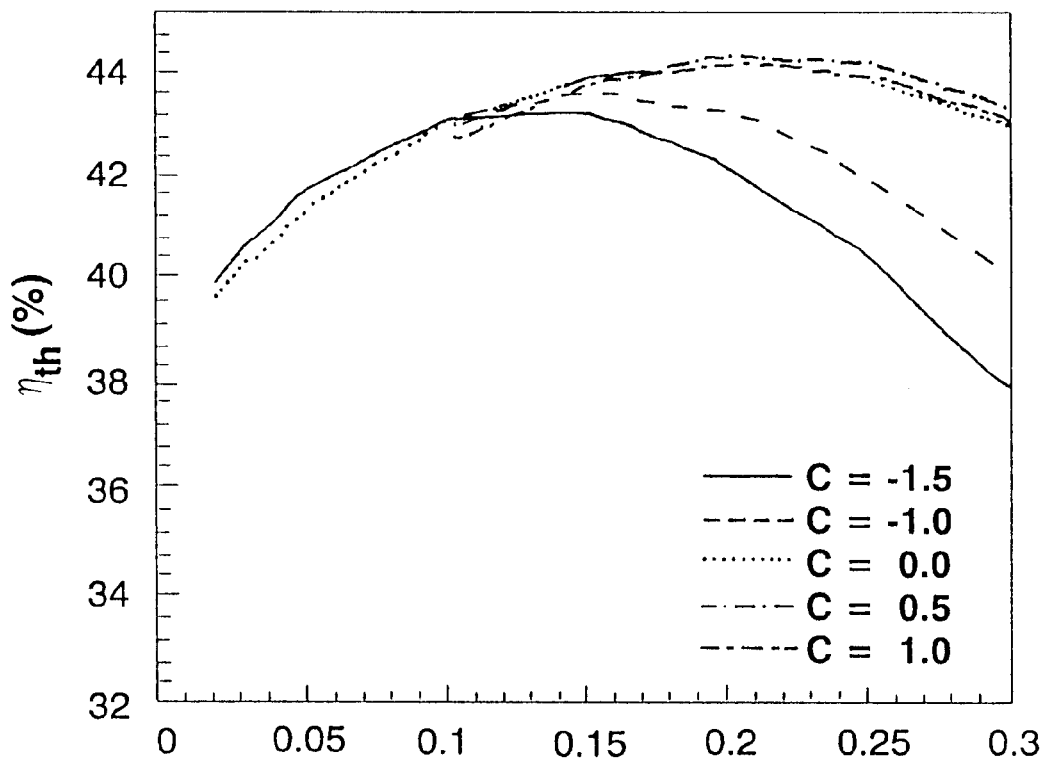
FIG. 3 is a graph depicting the theoretical relationship of engine efficiency as a function of supercharging parameter at specified parametric constants.

The theoretical thermal efficiency gain from turbocharging-intercooling is depicted in FIG. 3. In FIG. 3, $\eta_{th}$ denotes thermal efficiency and a denotes supercharging parameter, defined by $$p_i/p_0 = (p_{peak}/p_0)^\alpha \qquad (I)$$

where $p_i$ is the intake manifold pressure and $p_{peak}$ is the peak cylinder pressure. A theoretical maximum in thermal efficiency, hereafter designated as the first maximum, is shown in FIG. 3 at an optimum α, hereafter designated as the first optimum α. The first part of the present invention (operating principle) achieves satisfactory matching between turbocharger unit and piston-engine unit over broad range of speed/load. With the present invention this theoretical thermal efficiency gain is achievable over a broad range of speed/load.

Prediction in FIG. 3 is made based on constant $p_{peak}$ constraint and constant equivalence ratio φ constraint for a diesel engine. Computer-simulation study discovers design-parameters combination that produces thermal efficiency higher than the first maximum thermal efficiency at an optimum α higher than the first optimum α, also depicted in FIG. 3.

Figure 1:
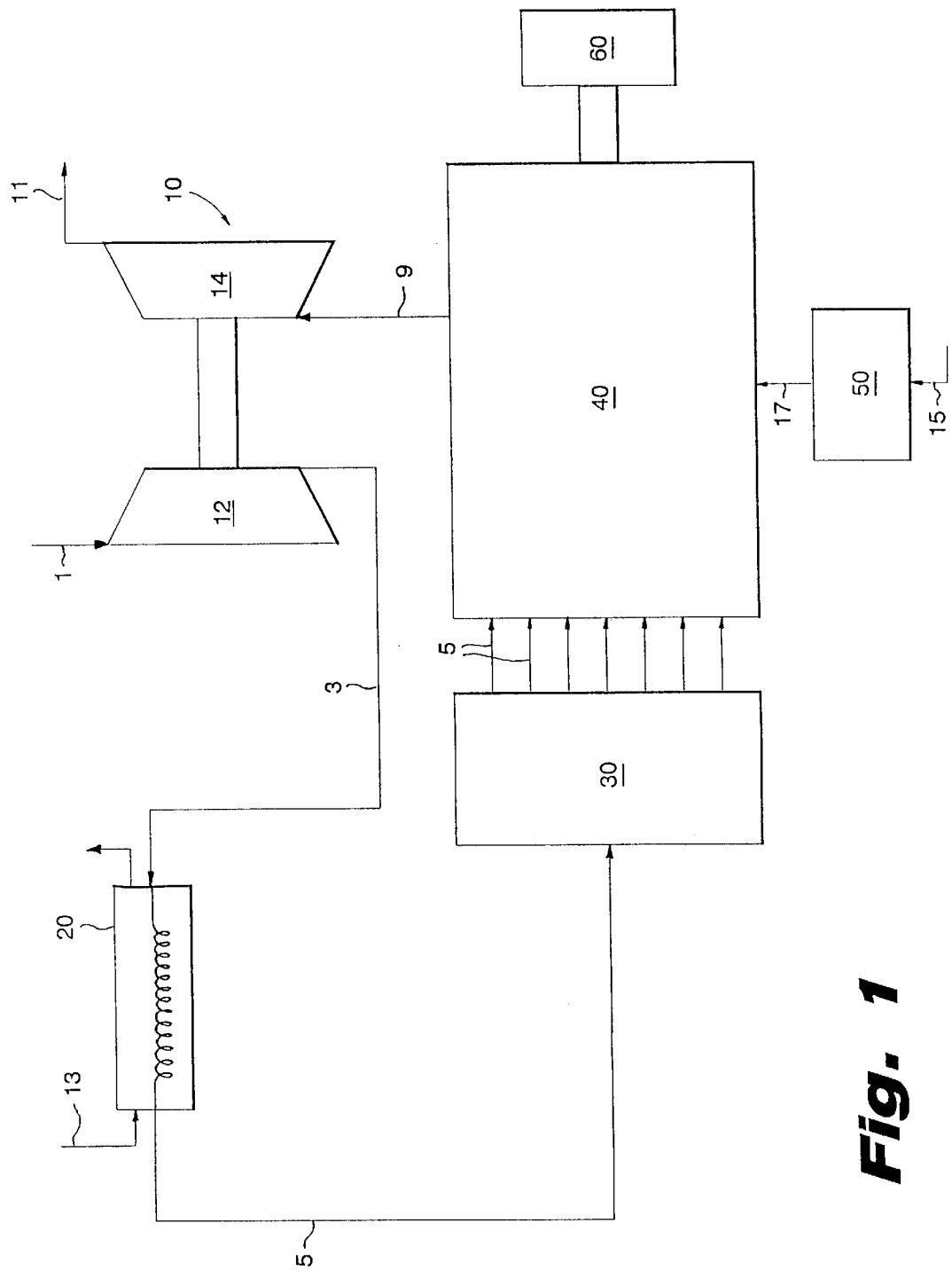
FIG. 1 is a flow diagram of an embodiment of a turbocharged internal combustion engine of the present invention.

A second embodiment of the present invention is depicted by the turbocharged-intercooled engine, of FIG. 1. The engine includes a turbocharger 10. The turbocharger 10 includes a compressor 12 and a turbine 14, which drives the compressor 12. Ambient air stream 1 at $T_0$ and $p_0$ enters compressor 12, therein is pressurized such that its temperature and pressure are increased to $T_1$ and $p_1$. The air stream exiting compressor 12, denoted by reference numeral 3, is characterized by a pressure $p_1$ that corresponds to the higher optimum $\alpha$ in FIG. 3.

Air stream 3 is next conveyed into an intercooler 20. That intercooler is cooled by a coolant stream 13 as illustrated in the drawing. The air stream leaving intercooler 20, denoted in FIG. 1 by reference numeral 5, has a temperature $T_2$ and a pressure $p_2$ that is nearly equal to $p_1$. Air stream 5 is transmitted to an intake manifold means 30. The intake manifold pressure $p_2$ is also referred to as $p_i$. Therein air stream 5 is conveyed into the cylinders of an internal combustion engine 40. The internal combustion engine 40 may be a diesel engine or a direct-injection gasoline engine—for the following reason.

The internal combustion engine 40 is provided with fuel metering means 50 for maintaining correct mixture ratio of air and fuel, such as diesel oil or gasoline. Fuel metering means 50, in a preferred embodiment, is a fuel injection device. Fuel-air mixture ratio or equivalence ratio $\phi$ is selected at a design point of engine operation according to a design procedure using the following formula:

$$\phi = \phi(T_{peak}, T_{ignition}) \qquad (II)$$

where $T_{ignition}$ is largely a function of intake-manifold temperature $T_i$ and compression ratio $r_C$ of a piston engine. $\phi$ is considered to be a function of $T_{peak} - T_{ignition}$ here because $T_{peak}$ depends basically on $T_{ignition}$ and $\phi$; design selection of $\phi$ is equivalent to design specification of $T_{peak}$ and $T_{ignition}$.

Our computer-simulation study discovers that constant $\phi$ vs. $\alpha$ condition can be represented by the expression in terms of $T_{ignition}$ and $T_{peak}$.

$$T_{peak}/T_{ignition} = [T_{peak/ignition}(\phi_{\alpha=0}) - b]e^{C\alpha} + b \qquad (III)$$

with a proper choice of C value and b value. For example, in FIG. 3, the C value of −1.5 is substantially equivalent to a constant equivalence ratio case, which shows a first thermal efficiency maximum. In the case of diesel engines the constant equivalence ratio case is referred to as the smoke point. This case is considered to be the baseline case. In the above expression, $T_{peak/ignition}(\phi_{\alpha=0})$ represents the ratio of peak cylinder temperature to ignition temperature for a naturally aspirated engine ($\alpha=0$) at the smoke point. Various $\phi$ vs. $\alpha$ design combination can now be represented by different C value.

For a basic engine block, a joint program of experimental and computer-simulation study can be carried out with different supercharging pressure ratio a and different scheduled changing of $\phi$ vs. $\alpha$. The objective is to find a scheduled changing, or a C value, that is closest to the baseline C value and produces most of the potential gain in thermal efficiency vs. supercharging parameter, $\alpha$. With that objective achieved, the $\alpha$ value that produces the same bmep as the first thermal efficiency maximum of the baseline case will be selected. See FIG. 3 for an example of this procedure. This $\alpha$ and the corresponding $\phi$, which is determined according to Equation (II) and Equation (III) form the design combination that brings about the same bmep, higher thermal efficiency, and significantly lower operating temperature, the objective of the second embodiment of the present invention. Since the design value of p is significantly lower than stoichiometric, this second embodiment of the present invention applies to only engines of the direct-injection type.

In a particularly preferred embodiment of the present invention, the design procedure that determines the design parameter combination of the second embodiment of the present invention is applied to the engine of the first embodiment of the present invention. The above advantage at design point of engine operation in moderately higher thermal efficiency and significantly lower operating temperature can be realized over a broad range of engine speed/load.

In summary, the second embodiment of the present invention remove thermal load as a limiting factor in improving engine performance. This suggests another two preferred embodiments of the present invention: utilizing a turbocharged engine in accordance with the second embodiment of the present invention permits evolutionary increase in mechanical load without a corresponding increase in thermal load. Similarly, utilizing a turbocharged engine in accordance with the first and second embodiments of the present invention also permits evolutionary increase in mechanical load without a corresponding increase in thermal load.

The above embodiments will make apparent to those skilled in the art other embodiments and examples. Those other embodiments and examples are within the contemplation of the present invention. Therefore, the present invention should be limited only by the appended claims.

What is claimed is:

1. A supercharged internal combustion engine comprising a first compressing means for pressurizing ambient air; an air cooling means, in communication with the outlet of said first compressing means, for cooling said pressurized air; an air separating means, in communication with said cooled pressurized air, for separating said cooled pressurized air into a first and a second air stream; an expansion means in communication with said second air stream, downstream of said air separating means; a heat transfer means, in communication with said first air stream exiting said air separating means and said second air stream exiting said expansion means, wherein heat is transferred from said first air stream to said second air stream and wherein the temperature of said first air stream is reduced to below ambient; intake manifold means, in communication with said first air stream exiting said heat transfer means, for distributing said first air stream; and an internal combustion engine, which includes a crankshaft and an exhaust manifold, in communication with the outlet of said inlet manifold means whereby said cooled and compressed air is introduced therein.

2. An engine in accordance with claim 1 wherein said first compressing means is a turbocharger.

3. An engine in accordance with claim 2 wherein said turbocharger comprises a compressor wherein said ambient air is compressed and a turbine, powered by the exhaust gas of said internal combustion engine, in communication with said exhaust manifold of said internal combustion engine, which powers said compressor of said turbocharger.

4. An engine in accordance with claim 1 wherein said expansion means includes a compressor wherein said second air stream exiting said heat transfer means is compressed to ambient pressure, and an expander, which powers said compressor, in communication with said second air stream entering said heat transfer means.

5. An engine in accordance with claim 1 wherein said internal combustion engine is a diesel engine.

6. An engine in accordance with claim 5 including fuel metering means wherein said fuel fed into said diesel engine is such that the equivalence ratio of the mixture of fuel provided by said fuel metering means to said air, introduced through said intake manifold, is less than the equivalence ratio of a diesel engine at the smoke point and wherein the supercharging parameter of air entering the diesel engine is greater than the supercharging parameter of air entering the diesel engine at the smoke point.

7. An engine in accordance with claim 6 wherein the equivalence ratio φ, is selected at a design point according to the formula $$\phi = \phi(T_{peak}, T_{ignition}) \text{ where}$$

$$T_{peak}/T_{ignition} = (T_{peak}/T_{ignition\,(\phi=0)} - b)e^{-C\alpha} + b$$

where $T_{peak}$ is the peak cylinder temperature; $T_{ignition}$ is the ignition temperature; C is a parametric constant; α is a supercharging parameter; $T_{peak}/T_{ignition(\phi=0)}$ is the ratio of peak cylinder temperature to ignition temperature of a naturally aspirated diesel engine at the smoke point; and b is a constant; wherein the stated relationships represent constant φ at the smoke point verses an increasing α when said parameter C assumes a baseline value; and wherein different C's represent different relationships of φ verses increasing α and wherein C is chosen such that it is closest to a baseline C and produces at least about 50% of the potential gain in thermal efficiency from a first thermal efficiency maxima and wherein α is chosen such that it produces the same brake mean effective pressure as the first thermal efficiency maxima and wherein intake air pressure and equivalence ratio are determined as functions of α and C.

8. An engine in accordance with claim 1 wherein said internal combustion engine is a spark ignition gasoline engine.

9. An engine in accordance with claim 1 wherein said internal combustion engine is a direct injection gasoline engine.

10. An engine in accordance with claim 9 including fuel metering means wherein said fuel fed into said direct ignition gasoline engine is such that the equivalence ratio of the mixture of fuel, provided by said fuel metering means, to said air, introduced through said intake manifold, is less than the equivalence ratio of a direct ignition gasoline engine operating at an equivalence ratio of between 0.85 and 0.95 and wherein the supercharging parameter of air entering the direct ignition gasoline engine is greater than the supercharging parameter of air of said direct ignition gasoline engine at an equivalence ratio of between 0.85 and 0.95.

11. An engine in accordance with claim 10 wherein the equivalence ratio φ is selected at a design point according to the formula $$\phi = \phi(T_{peak}, T_{ignition}) \text{ where}$$

$$T_{peak}/T_{ignition} = (T_{peak}/T_{ignition(\phi=0)} - b)e^{-C\alpha} + b$$

where $T_{peak}$ is the peak cylinder temperature; $T_{ignition}$ is the ignition temperature; C is a parametric constant; $T_{peak}/T_{ignition(\phi=0)}$ is the ratio of peak cylinder temperature to ignition temperature of a naturally aspirated direct injection gasoline engine; and b is a constant; wherein the stated relationships represent constant φ at an equivalence ratio of between about 0.85 and about 0.95 versus an increasing a when said parameter C assumes a baseline value; and wherein different C's represent different relationships of φ verses increasing α and wherein C is chosen such that it is closest to a baseline C and produces at least about 50% of the potential gain in thermal efficiency from a first thermal efficiency maxima and wherein α is chosen such that it produces the same brake mean effective pressure as the first thermal efficiency maxima and wherein intake air pressure and equivalence ratio are determined as functions of α and C.

12. A turbocharged diesel engine comprising a turbocharger, which comprises a compressor and a turbine, in communication with ambient air, wherein said ambient air is pressurized by said compressor to greater than ambient pressure; an intercooler, in communication with the outlet of said compressor, wherein said temperature of said greater than ambient pressure air is reduced; an intake manifold, in communication with said outlet of said intercooler, for distributing said cooled and above ambient pressure air; a diesel engine, in communication with said intake manifold, provided with a crankshaft and an exhaust manifold, said exhaust manifold in communication with said turbine of said turbocharger; a fuel metering means for introducing fuel into said diesel engine such that the equivalence ratio of the mixture of fuel, provided by said fuel metering means, and air, provided by said intake manifold, is less than the equivalence ratio of a diesel engine at the smoke point and wherein the supercharging parameter of the air entering the diesel engine is greater than the supercharging parameter of air of said diesel engine at the smoke point.

13. A turbocharged diesel engine in accordance with claim 12 wherein the equivalence ratio φ is selected at a design point according to the formula $$\phi = \phi(T_{peak}, T_{ignition}) \text{ where}$$

$$T_{peak}/T_{ignition} = (T_{peak}/\text{Tignition}(\phi=0) - b)e^{-C\alpha} + b$$

where $T_{peak}$ is the peak cylinder temperature; $T_{ignition}$ is the ignition temperature; C is a parametric constant; α is a supercharging parameter; $T_{peak}/T_{ignition(\phi=0)}$ is the ratio of peak cylinder temperature to ignition temperature of a natural aspirated diesel engine; and b is a constant; wherein the stated relationships represent constant φ at the smoke point verses an increasing α when said parameter assumes a baseline value; and wherein different C's represent different relationships of φ verses increasing α and wherein C is chosen such that it is closest to a baseline C and produces at least about 50% of the potential gain in thermal efficiency from the first thermal efficiency maxima and wherein α is chosen such that it produces the same brake mean effective pressure as the first thermal efficiency maxima and wherein intake air pressure and equivalence ratio are determined as functions of α and C.

14. A turbocharged gasoline engine comprising a turbocharger, which comprises a compressor and a turbine, in communication with ambient air wherein said ambient air is pressurized by said compressor to greater than ambient pressure; an intercooler in communication with the outlet of said compressor wherein said temperature of said greater than ambient pressure air is reduced; an intake manifold, in communication with said outlet of said intercooler, for distributing said cooled and above ambient pressure air; a gasoline engine, in communication with said intake manifold, provided with a crankshaft and an exhaust manifold, said exhaust manifold in communication with said turbine of said turbocharger; a fuel metering means for introducing fuel into said gasoline engine such that the equivalence ratio of the mixture of fuel, provided by said fuel metering means, to said air, provided by said intake manifold, is less than the equivalence ratio of a gasoline engine operating at an equivalence ratio of about 0.85 to about 0.95 and wherein the supercharging parameter of the air entering the gasoline engine is greater than the supercharging parameter of air entering the gasoline engine at an equivalence ratio of between about 0.85 and about 0.95.

15. A turbocharged gasoline engine in accordance with claim 14 wherein the equivalence ratio φ, is selected at a design point according to the formula $$\phi = \phi(T_{peak}, T_{ignition}) \text{ where}$$

$$T_{peak}/T_{ignition} = (T_{peak}/T_{ignition(\phi=0)} - b)e^{-C\alpha} + b$$

where $T_{peak}$ is the peak cylinder temperature; $T_{ignition}$ is the ignition temperature; C is a parametric constant; α is a supercharging parameter; $T_{peak}/T_{ignition(\phi=0)}$ is the ratio of peak cylinder temperature to ignition temperature of a naturally aspirated gasoline engine; and b is a constant; wherein the stated relationships represent constant φ at an equivalence ratio of between about 0.85 and about 0.95 versus an increasing a when said parameter C assumes a baseline value; and wherein different C's represent different relationships of φ verses increasing α and wherein C is chosen such that it is closest to a baseline C and produces at least about 50% of the potential gain in thermal efficiency from the first thermal efficiency maxima and wherein α is chosen such that it produces the same break mean effective pressure as the first thermal efficiency maxima and wherein intake air pressure and equivalence ratio are determined as functions of α and C.

16. A turbocharged gasoline engine in accordance with claim 14 wherein said gasoline engine is a direct injection gasoline engine.

\* \* \* \* \*

UNITED STATES PATENT AND TRADEMARK OFFICE
CERTIFICATE OF CORRECTION

PATENT NO. : 6,158,217
DATED : December 12, 2000
INVENTOR(S) : L. Wang

It is certified that error appears in the above-identified patent and that said Letters Patent is hereby corrected as shown below:

Title page,
Item [56], References Cited, under U.S. PATENT DOCUMENTS, insert
-- 3,592,958  7/1971  Nebgen
   3,870,029  3/1975  Crook, et al.
   4,077,219  3/1978  Melchior, et al.
   4,124,979  11/1978 Tholen, et al.
   4,483,150  11/1984 Melchior, et al.
   5,036,668  8/1991  Hardy
   5,598,705  2/1997  Uzkan --

Column 7,

Line 53, "Tignition" should read -- $T_{ignition}$ --
Line 57, "a" should read -- $\alpha$ --

Column 8,

Line 27, "Tignition" should read -- $T_{ignition}$ --

Signed and Sealed this

Thirteenth Day of August, 2002

Attest:

Attesting Officer

JAMES E. ROGAN
*Director of the United States Patent and Trademark Office*